United States Patent [19]

Dumas

[11] 4,081,189
[45] Mar. 28, 1978

[54] SECTIONAL IRON FOR ARTICULATED FITTING, MORE PARTICULARLY FOR A VEHICLE BODY STRUCTURE

[75] Inventor: Jean-Claude Dumas, Velizy-Villacoublay, France

[73] Assignee: Societe Generale de Constructions Electriques et Mecaniques Alsthom S.A., Paris, France

[21] Appl. No.: 670,008

[22] Filed: Mar. 24, 1976

[30] Foreign Application Priority Data

Mar. 28, 1975 France .............................. 75 09968

[51] Int. Cl.² .............................................. F16L 39/00
[52] U.S. Cl. .................................. 285/137 R; 285/47;
    285/184; 285/261; 285/286; 52/285
[58] Field of Search ............. 285/261, 47, 136, 137 R,
    285/184, 62, 286; 403/84, 90; 138/111, 115,
    116, 117, 120; 52/588, 285, 595

[56] References Cited

U.S. PATENT DOCUMENTS

| | | | |
|---|---|---|---|
| 2,164,681 | 7/1934 | Fould | 52/588 X |
| 2,828,842 | 4/1958 | Plumley et al. | 52/285 X |
| 3,093,219 | 6/1963 | Romme | 138/117 |

FOREIGN PATENT DOCUMENTS

| | | | |
|---|---|---|---|
| 1,244,446 | 9/1960 | France | 285/261 |
| 869,452 | 3/1953 | Germany | 285/261 |
| 931,206 | 8/1955 | Germany | 285/261 |

*Primary Examiner*—Dave W. Arola
*Attorney, Agent, or Firm*—Haseltine, Lake & Waters

[57] ABSTRACT

A self-resistant light-alloy sectional member for an articulated fitting, which can be formed by extrusion. The sectional member is characterized in that its cross-section is closed to form an elongated box and in that at least one of the thickness edges of the sectional member has a rigid longitudinal fastening portion, enabling a fitting without any deformation together with a sectional member whose thickness edge is contiguous, provided with a corresponding fastening part running along it.

3 Claims, 7 Drawing Figures

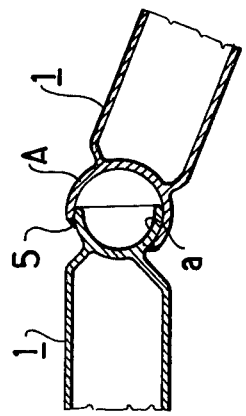
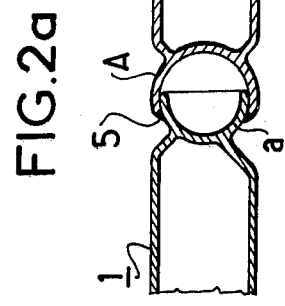
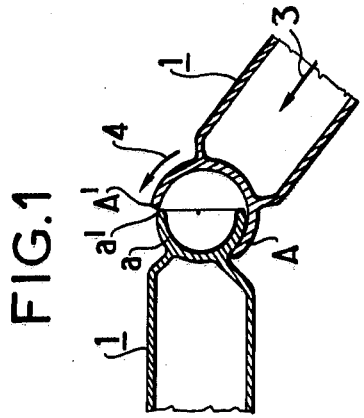
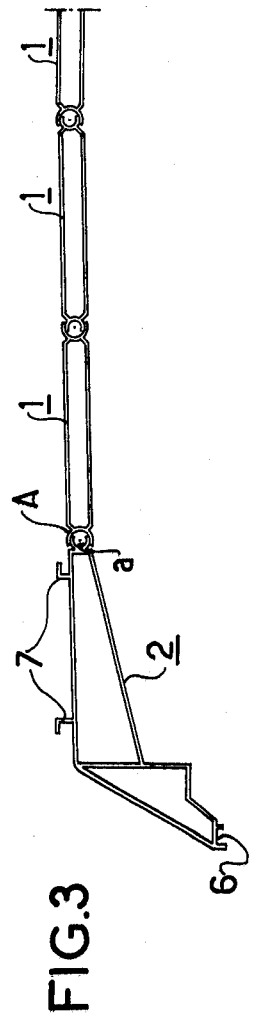
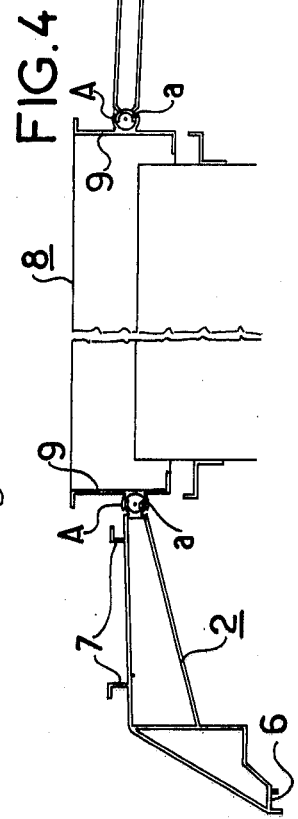

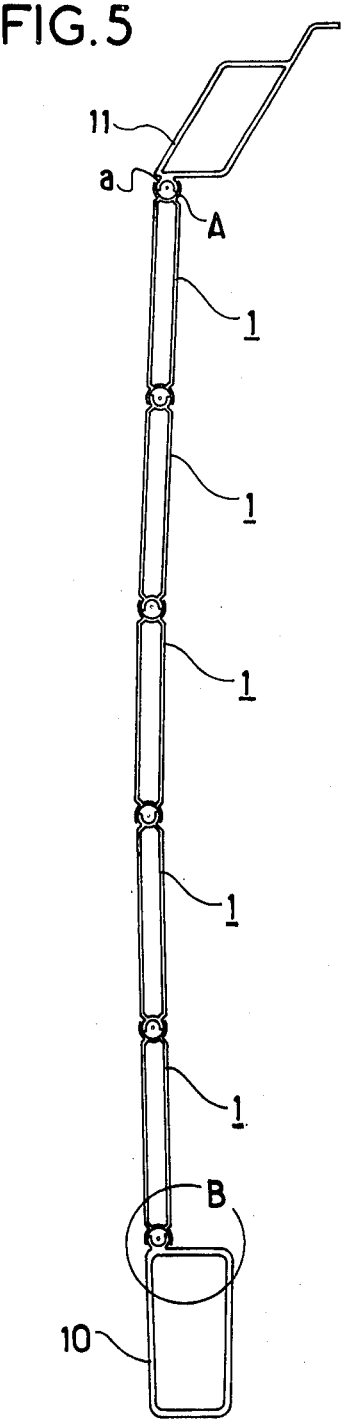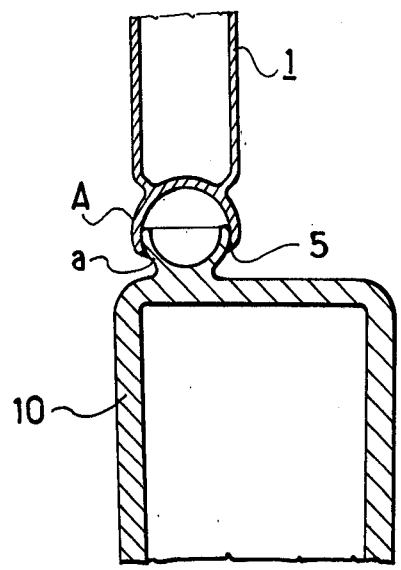

SECTIONAL IRON FOR ARTICULATED FITTING, MORE PARTICULARLY FOR A VEHICLE BODY STRUCTURE

The present invention relates to a self-supporting sectional member for an articulated fitting, more particularly for a railway or road vehicle body structure and concerns, more especially, the assembling of sectional members so as to obtain elements whose structure has an outside surface with a required curvature or, contingently a plane surface. In usual embodiments of elements of vehicle bodies, it is a known practice to adjoin transverse reinforcing parts or ribs to ensure the required rigidity; now, in the case of convex structures, it is difficult to form such ribs by machine welding, since the required transverse welds can be effected only by specialists.

An object of the invention is to provide a basic sectional member as a self-resistant modular construction element, provided with transverse fastening parts enabling fitting into adjacent sectional members arranged on either side and capable of being secured together by longitudinal welding which is easy to effect by means of an automatic welding machine, thus eliminating most of the transverse manual welds according to the prior art.

The main characteristic feature of the sectional member according to the invention resides in its geometrical configuration with a closed and elongated cross-section to constitute a closure and in that at least one of the thickness edges of the said sectional member has a rigid longitudinal fastening made part a enabling a fitting without any deformation together with a sectional member with a female part.

The aim and the advantages of the present invention will become apparent from the description of a few non-limiting embodiments related to the drawing, in which:

FIG. 1 is a transverse cross-section of two adjacent sectional members in the engaging position;

FIGS. 2a and 2b are views of two adjacent sectional members secured together to form, respectively, a plane surface and a curved surface;

FIG. 3 is a cross-section of one-half of a symmetrical roof element,

FIG. 4 is a cross-section of a roof element provided with an opening;

FIG. 5 is a cross-section of a front side element of a vehicle body; and

FIG. 6 is an enlarged view of portion B of FIG. 5.

In FIG. 1, two basic sectional members 1 made of an aluminum alloy are fitted into oblique end contact by means of fastening parts of two types a and A: type a being a female part having a cross-sectional shape in the form of an arc of a circle, the radius of the outside cylindrical surface being equal to the radius of the arc of a circle of the inside cylindrical surface of the male part or type A.

When oblique contact has been obtained, by exerting a pressure in the direction of the arrow 3 on the sectional member provided with the fastening part of type A, the ends a' and A' of the arcs of a circle of the respective fastening parts a and A have a play enabling the fitting together of the two fastening parts and turning of the sectional member having the fastening part A in the direction of the arrow 4.

In FIG. 2a, the two sectional members are fitted together in end to end relation and are secured together by longitudinal, continuous, fluid-tight weld beads 5, effected, more particularly, by means of automatic welding machines.

In FIG. 2b, the two sectional members are fitted together and welded in the same way by longitudinal weld beads 5 in an oblique position in relation to one another determined by the curvature to be provided for the outside surface of the vehicle body element to be obtained.

In FIG. 3, the sectional members 1 are fitted into each other and secured together in the required oblique configuration for reproducing the curve of a vehicle roof whose two transverse ends are terminated by sectional members 2 whose edges are provided with a fastening part of type a fitted into the fastening part of type A on the adjacent sectional member 1. The sectional member 2 comprises, moreover, a seal groove 6, intended for accomodating a seal ring, comprised between the upper part of the lateral face and of the structure and the detachably fixed roof. The supports 7 are intended to receive the gangways of the roof.

In FIG. 4, the roof element comprises, as a variant, an opening 8 whose lateral sides have, longitudinally, round their edges, sectional members 9 having fastening parts A having, fitted into them on one side, the fastening part a of a sectional member 1 and on the other side, the fastening part a of an edge sectional member 2.

In FIG. 5, the sectional members 1 secured to one another form a curved surface of a lateral front element of a vehicle ending, at the top, with a sectional member 11 for reinforcing the top roof, provided with a fastening part of the type a fitted into the fastening part A of the upper sectional iron 1, whereas at the bottom, the end part is formed by a sectional member 10 of the longitudinal girder of the chassis whose fastening part, of the type a, is fitted into the fastening part of the type A of the sectional iron 1 situated above as shown in FIG. 6 in which the longitudinal weld beads 5 ensure that the fastening parts fitted into each other are secured together.

That type of structure obtained by the assembling of sectional members having various shapes, connected to each other by means of fastening parts of two complementary types, is a particular advantage when manufacturing with light alloy, since their dimensions can be determined so as to be able to be produced at a low price by extrusion.

It is self-evident that these few embodiments have no exhaustive character and that the protection applied for by the present application comprises all the variants equivalent to the means described and comprised in the general definition given of the invention.

That invention applies more particularly, but not exclusively, to the manufacture of light alloy vehicle body structures, the industrial production of which can be greatly automated by the manufacturing of sectional members which can be connected together by extrusion and by assembling of the said sectional members by automatic argon arc welding.

Moreover, and from the overall point of view, the production of self-supporting sectional members in the form of hollow boxes enables various combined uses. For example, a sectional member can be inserted in the air flow circuit and be used as a tube taking part in the ventilating of the vehicle. Likewise, the inside walls of the sectional members can be coated with materials for effecting heat and sound isolation of the vehicle.

What is claimed is:

1. An assembly adapted for mounting in a vehicle body structure, comprising: a first member; a second member joined edgewise to said first member; said first member having a female fastening portion extending longitudinally along an edge thereof provided with a longitudinally extending cylindrical bore and a longitudinally extending slot defined by a pair of lips and being outwardly directed from said first member to provide edgewise access into said bore; said second member being provided with a male fastening portion extending longitudinally along an edge thereof and an outer cylindrical surface of substantially the same diameter as said bore, said outer cylindrical surface extending over a predetermined arc of a cylinder, being operable through a neck portion with shoulders, said neck portion and shoulders connecting said male member to said second member, said neck portion extending over a fraction of said arc; the width of said slot in said female fastening portion, the predetermined arc and the width of said neck portion, being so disposed whereby said male fastening portion is engageable with said female fastening portion, without deformation of either fastening portion when one of said lips of said slot is in contact against a shoulder of said neck portion whereby the respective cylindrical axes are substantially coincident, said members being rotatable about their common axis to enable engagement between the respective fastening portions with both lips of said slot positioned over respective parts of said outer cylindrical surface; and locking means for locking the fastening portions at a desired relative angular disposition of said member.

2. An assembly as claimed in claim 1 whereby said locking means comprises at least one longitudinal continuous fluid-tight weld bead joining said fastening portions of said first and second members.

3. An assembly as claimed in claim 1 comprising: a section having at least one opening, said assembly being contiguous with said opening and attachable by an associated fastening portion with respective fastening portions provided at respective longitudinal edges formed of by said opening.

* * * * *